UNITED STATES PATENT OFFICE.

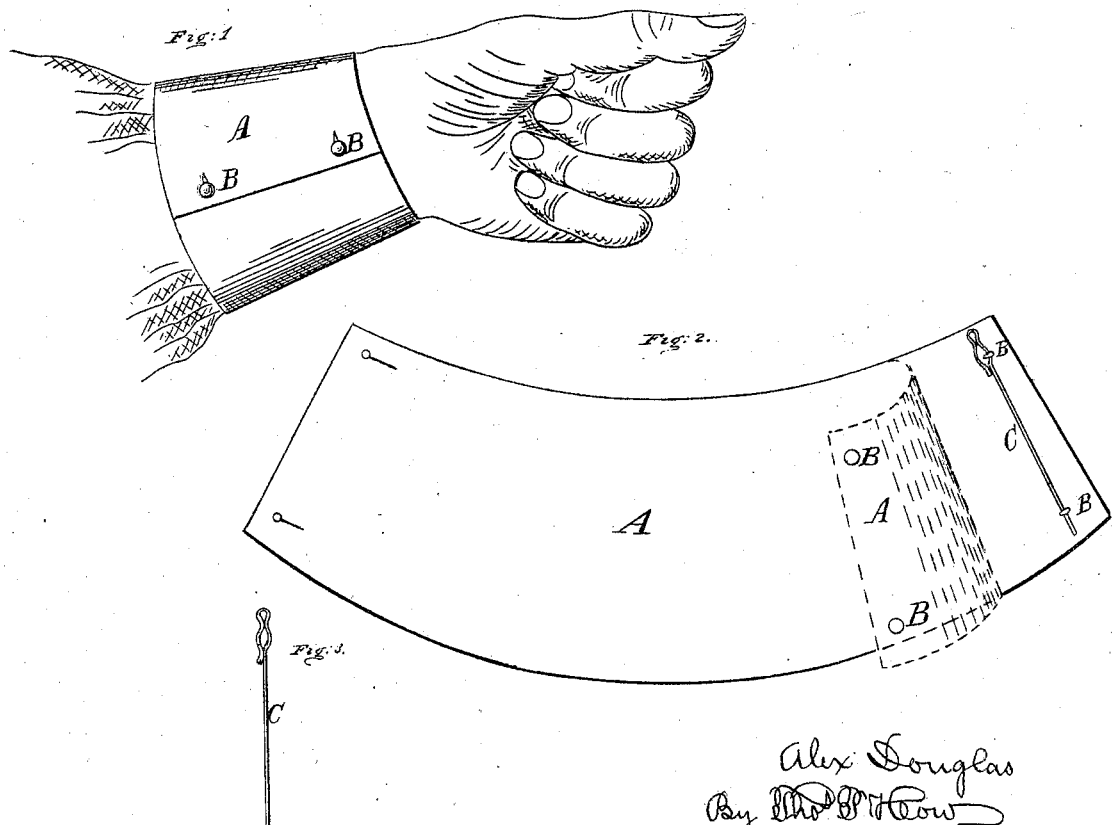

ALEXANDER DOUGLAS, OF ENGLISH NEIGHBORHOOD, ASSIGNOR TO HIMSELF AND SAMUEL S. SHERWOOD, OF AQUACKANONCK, N. J.

IMPROVEMENT IN CUFF-FASTENERS.

Specification forming part of Letters Patent No. 42,434, dated April 19, 1864.

*To all whom it may concern:*

Be it known that I, ALEXANDER DOUGLAS, of English Neighborhood, in the county of Bergen and State of New Jersey, have invented a certain new and useful Improvement in Cuff-Fasteners; and I do hereby declare the following to be a full, clear, and exact description thereof, reference being had to the accompanying drawings, in which—

Figure 1 represents the cuff fastened in position on the arm. Fig. 2 represents the cuff, first, in a horizontal position, showing the fastener in its place, and then with the end rolled back to show the buttons, which are kept in their places by the fastener.

My invention and improvement consist in extending one arm of the ordinary button-fastener so as to reach across the cuff, as represented in Fig. 2, thus fastening all the buttons with the same fastener. At the same time it acts as a stay, keeping the cuff from wrinkling. Cuffs thus fastened will keep their form longer and better than when fastened in any other way known previous to my invention.

Button-fasteners have been made similar to the upper part of my fastener; but they were intended and used only to fasten single buttons, and not as in my invention, where one fastener fastens all the buttons attached to the cuff. Nor has a button-fastener ever before been used as a stay to keep the cuff in form and position and prevent its getting out of shape while worn—all of which is accomplished by my fastener, and constitutes it a new and useful article of manufacture.

In the drawings, A represents an ordinary lady's cuff, made in the usual manner. B B are the buttons by means of which it is secured. C is a fastener, which serves the twofold purpose of securing the buttons and of stiffening the cuff at that point, so as to prevent it from wrinkling.

This button-fastener C is made of a piece of steel wire or its equivalent, one end of which is turned over and formed into a sort of spring-link, as represented in the drawings, and in such a manner as to secure it from accidental displacement when interlocked in the manner shown in Fig. 2 in the eye of one of the buttons. The other end of the wire C is cut off to the proper length to extend through the eye of the other button when the cuff is fastened with two buttons, or all the others when more than two are used. By this construction and combination of parts the buttons on the cuff are all secured by the same fastening, the fastener C is secured from displacement by any ordinary casualty, and the cuff itself is supported at the point where it is most likely otherwise to become wrinkled.

I am aware that buttons for vests and other garments have been secured in place by a spring-link similar to what the fastener C would be if the extended end of the wire were cut off opposite to or even with the other end; and I am also aware that mail-bags and memorandum-books have been secured by means of a strap, chain, or rod passing through several loops. I claim none of these last-mentioned devices, and they are not adapted to the purpose of my invention.

I claim—

The fastener C, constructed substantially as described—that is to say, one end thereof being formed into a spring link to secure it from displacement by interlocking with the eye of a button, in the manner set forth, and the other end extending from the link, so as to be capable of securing other buttons in their proper places, substantially as set forth.

ALEX. DOUGLAS.

Witnesses:
THOS. P. HOW,
JAMES T. GRAHAM.